Figure 1:
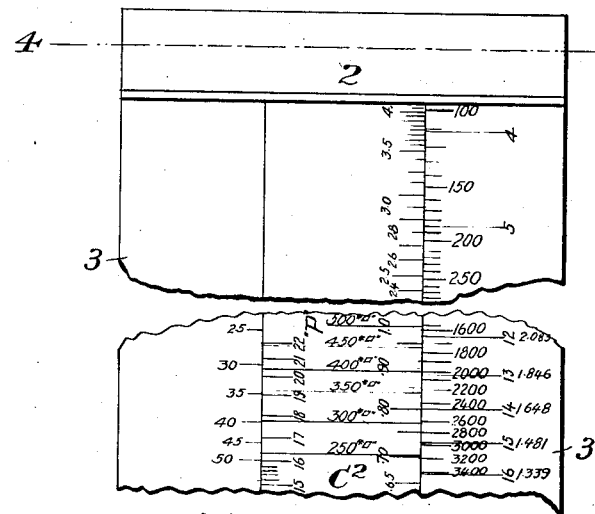

J. McC. MICHAELSON.
LOGARITHMIC SCALE.
APPLICATION FILED MAR. 12, 1907.

1,001,061.

Patented Aug. 22, 1911.
5 SHEETS—SHEET 3.

WITNESSES:
Jas. Es. Hutchinson
Tho. T. Strath.

INVENTOR:
Joseph McC. Michaelson,
BY
ATTORNEYS.

J. McC. MICHAELSON.
LOGARITHMIC SCALE.
APPLICATION FILED MAR. 12, 1907.

1,001,061.

Patented Aug. 22, 1911.

5 SHEETS—SHEET 4.

WITNESSES:
Jas E Hutchinson
Thos R Heath

INVENTOR:
Joseph McC. Michaelson
BY
ATTORNEYS.

J. McC. MICHAELSON.
LOGARITHMIC SCALE.
APPLICATION FILED MAR. 12, 1907.

1,001,061.

Patented Aug. 22, 1911.
5 SHEETS—SHEET 5.

UNITED STATES PATENT OFFICE.

JOSEPH McC. MICHAELSON, OF GENEVA, NEW YORK.

LOGARITHMIC SCALE.

1,001,061.   Specification of Letters Patent.   Patented Aug. 22, 1911.

Application filed March 12, 1907. Serial No. 361,915.

*To all whom it may concern:*

Be it known that I, JOSEPH McC. MICHAELSON, a citizen of the United States, residing at Geneva, in the county of Ontario and State of New York, have invented certain new and useful Improvements in Logarithmic Scales, of which the following is a specification, reference being had therein to the accompanying drawing.

This invention relates to certain new and useful improvements in the construction of calculating or slide rules, particularly adapted for use in solving problems involved in designing and in investigating the design of reinforced concrete.

The object of the present invention is the provision of a scale or rule of this character for mechanically calculating problems involved in designing and in investigating the design of reinforced concrete beams, by which with certain given factors the other factors may be readily determined without the necessity of calculation or reference to rules, tables, or data, other than those furnished by the rule in use.

For the purposes of the specification the term "beams" is used in the sense of structures subjected to transverse loads or eccentric forces.

The invention comprises broadly a rule provided with a series of scales indicating the factors laid out in distances proportional to the logarithms of each series of factors, certain of said scales being movable with reference to certain others of the scales, so that their adjustment will effect an addition or subtraction of the logarithms of the factors in the manner well known in the construction of slide rules. The particular location or order of the scales is not material, provided they are so arranged with reference to one another that their relative movements will correspond with the mathematical calculations involved by the formulæ, and I have, therefore, in the drawings, accompanying this specification, shown several different forms of scales for carrying out the invention.

Figure 2:
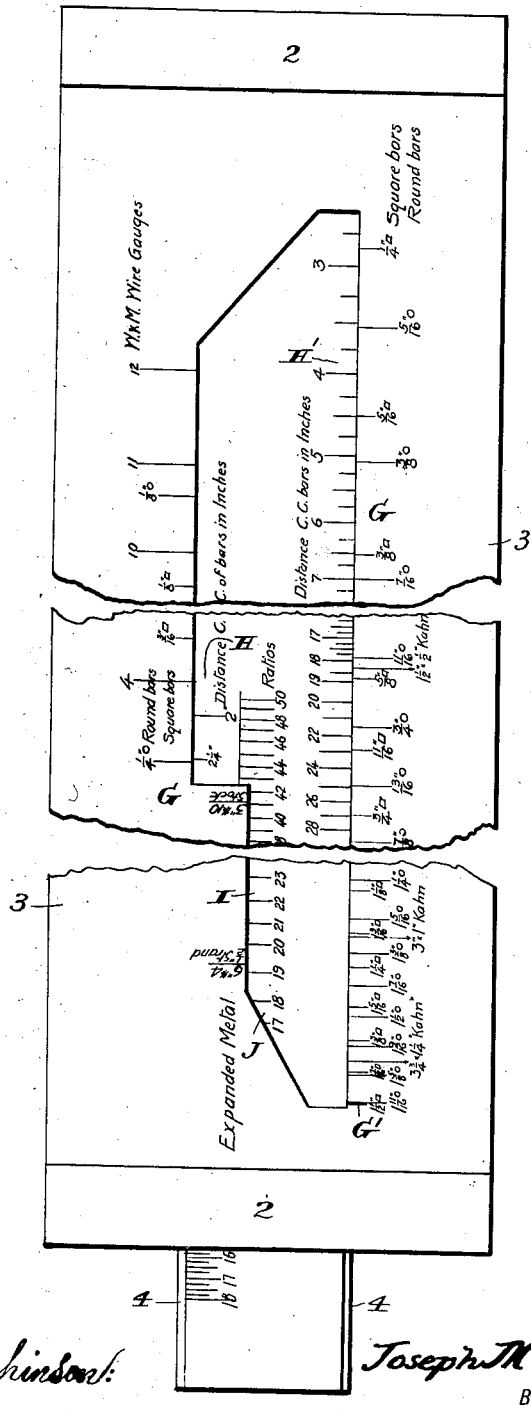
Figure 3:
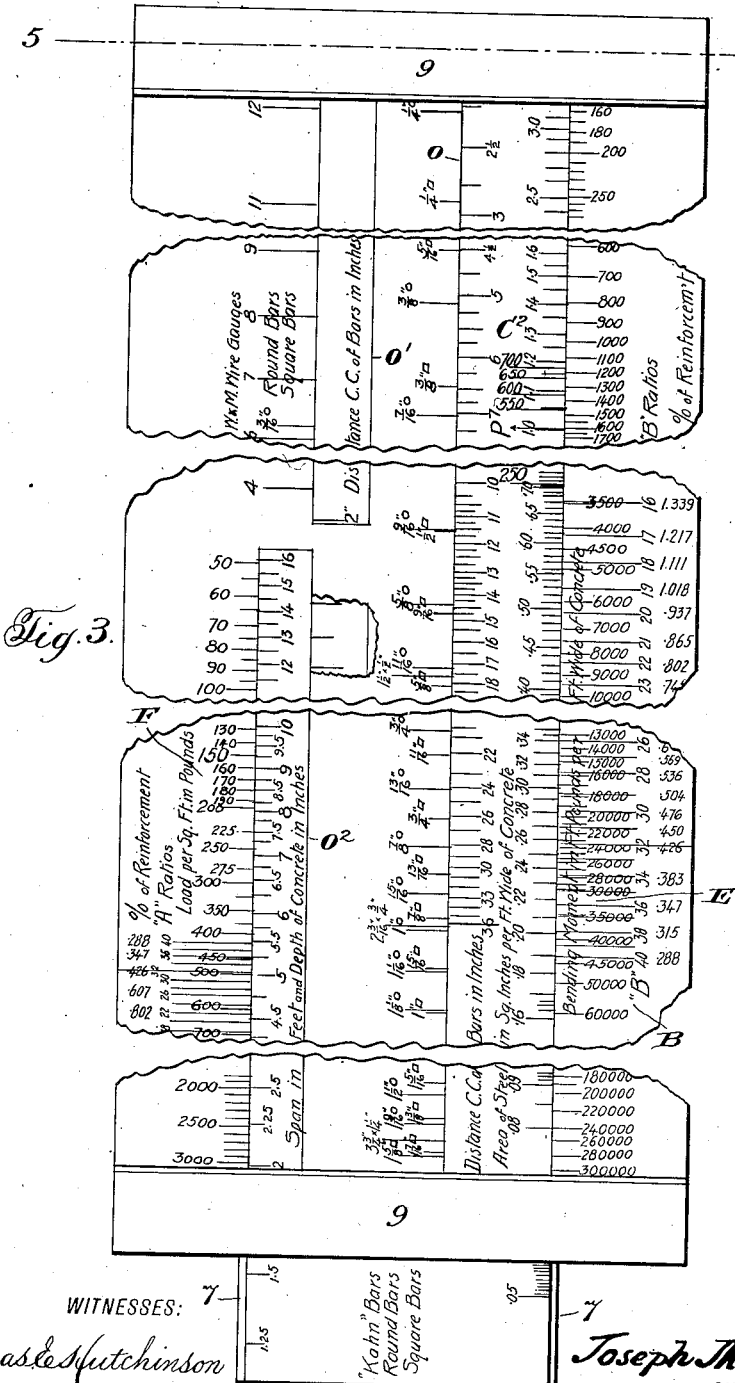
Figure 5:
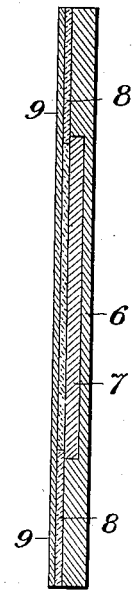
Figure 6:
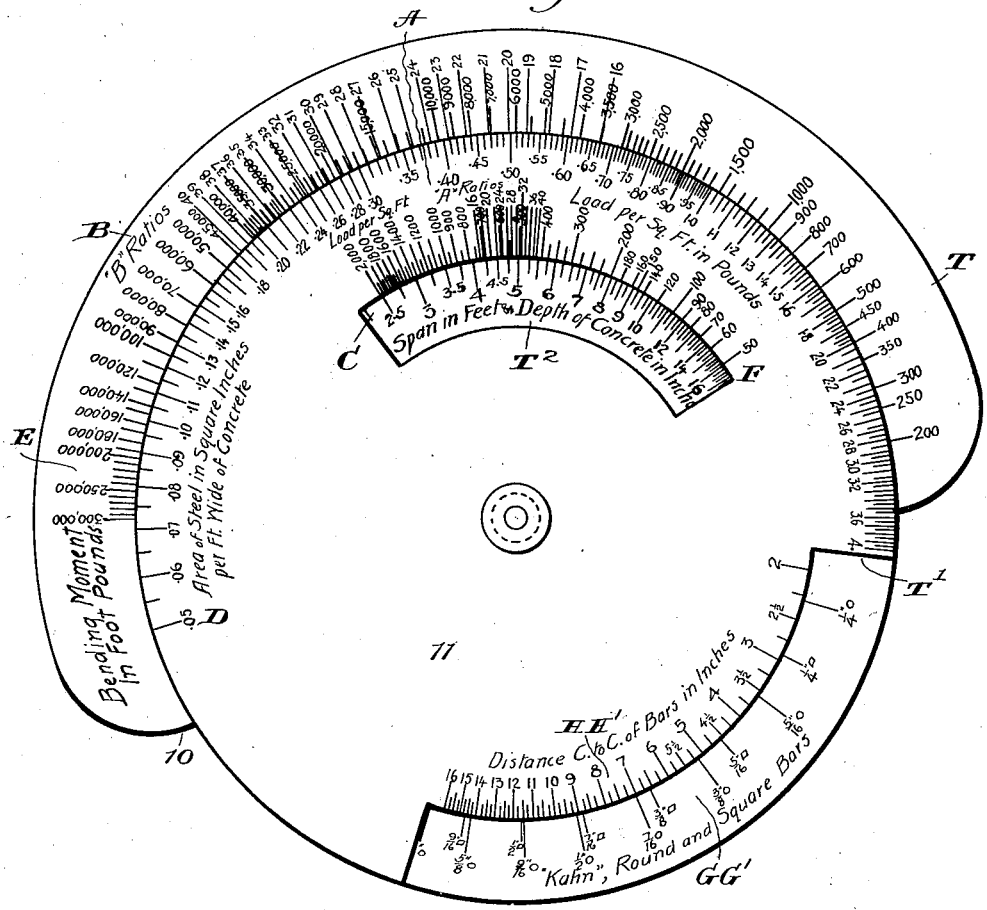
Figure 7:
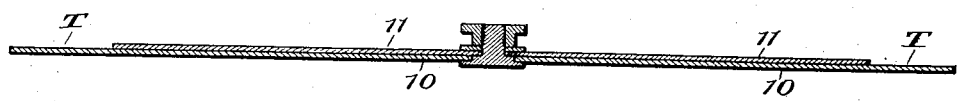
Figure 8:
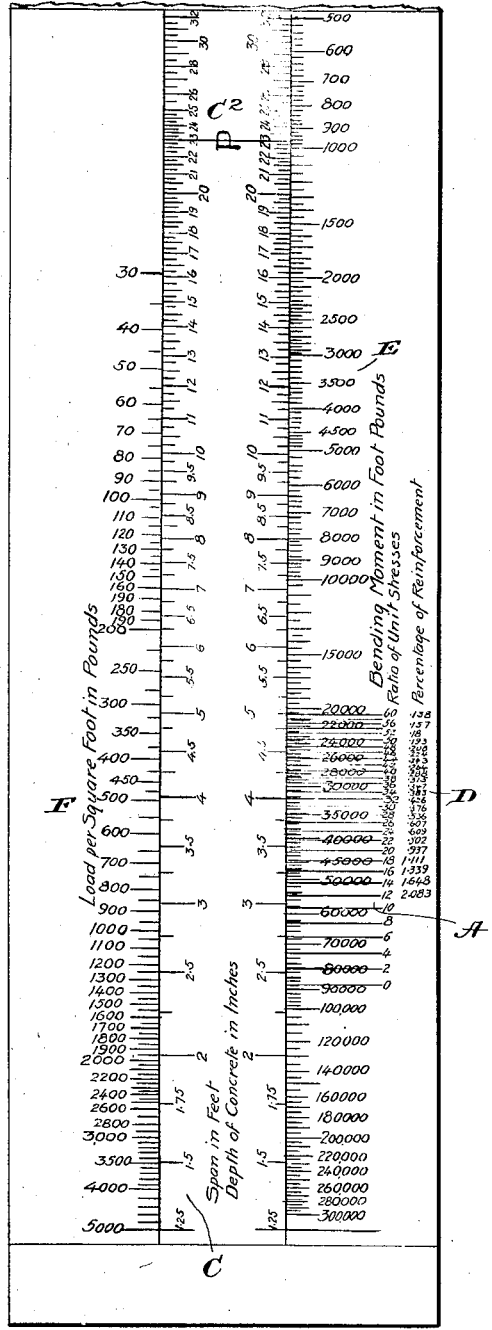

Referring now more particularly to the drawings, wherein like numerals of reference refer to similar parts, Figure 1 is a plan view of one side of my improved rule, showing the same in position for use in the solution of certain problems as hereinafter described and demonstrated. Fig. 2 is a plan view of the reverse side of the rule illustrated in Fig. 1. Fig. 3 is a plan view of a modified form of the invention in which all of the scales are confined to one side of the rule. Fig. 4 is a cross section on line 4—4 of Fig. 1. Fig. 5 is a cross section on line 5—5 of Fig. 3. Fig. 6 is a modified form of the invention as applied to a rotary rule. Fig. 7 is a cross section of the same, and Fig. 8 is a modified form of Fig. 1, showing a variation in the scale arrangement.

While the rule may be constructed in any suitable manner, I prefer to construct the same as shown in Figs. 1, 2 and 3, in which, 1—1 designates separated square edged side pieces, preferably formed of laminated material to prevent warping thereof. These pieces are rigidly connected at their ends by metallic cross pieces 2—2 secured to the upper and lower faces thereof. The upper and lower faces of the side pieces 1—1 are covered preferably by celluloid sheets 3—3, which are secured in position by any convenient means, and upon which are designed to be marked certain scales hereinafter referred to. The sheets 3—3 on the rear are provided with suitable slots or openings therein, so that the sliding portion of the scale which works between the side pieces 1—1 may be observed and brought into proper position when the rule is in use. The slide comprises a member 4, which fits between the side pieces 1—1, and the edges of which are squared and fit snugly against the squared edges of said side pieces. Displacement of the slide 4 by tilting is prevented by means of the overhanging celluloid plates 3—3 which are as stated secured to the upper and lower faces of the side strips. Secured to the upper and lower faces of the slide 4 are plates of celluloid or other suitable material on which are marked the scales hereinafter set forth. The square edges of the slide working against the square edges of the side members affords a better bearing than the tongue and groove ordinarily employed with slide rules and prevents any side play or binding of the slide in operation.

In the form of my invention illustrated in Figs. 1 and 2, the sheet of celluloid or other material covering the upper faces of the side pieces 1—1 is divided medially thereof by a longitudinal opening extending substantially the entire length of the rule through which the upper face of the slide may be observed. The edges of said opening are straight and along one edge thereof is marked off a scale A of ratios of unit stresses and percentages of metal reinforcement, and a scale F of loads per square foot in pounds. Along the other straight edge of the opening is marked a scale B of ratios of unit stresses and percentages of metal reinforcement and a scale E of bending moments in foot pounds per foot wide of concrete. Marked on the plate of celluloid or other material secured to the upper face of the slide 4, so as to coöperate with the scales A and F hereinbefore referred to, is a scale C, indicating span in feet and depth of concrete in inches, and also marked on the upper face of the slide 4 so as to coöperate with the scales B and E hereinbefore referred to, is a scale D indicating area of steel in square inches per foot wide of concrete. The upper face of the slide 4 has also marked thereon a scale $C^2$, indicating pounds per square inch on concrete. The scales A, B, C, $C^2$, D, E and F are logarithmic scales, that is, scales in which the distance of any number from the unit of the scale corresponds to the mantissa of the logarithm of that number and such scales are divided into as many parts as is desired, the number and degree of fineness of the subdivisions being optional with the manufacturer. The celluloid or other plate 3 secured over the bottom faces of the side pieces 1—1 is also provided medially thereof with an opening through which the lower face of the slide 4 may be observed. The portion of the celluloid sheet forming one edge of this opening is straight, and has marked thereon a scale G indicating standard commercial sizes of round and square rods used in concrete reinforced work and also a scale G′ indicating special types of bars sometimes used when "discontinuous" or separated material is employed in reinforcement of concrete. A portion of the parts 1—1 and celluloid sheet 3 forming the back piece of the body of the rule is formed in several straight open sections, which are offset from each other, one of which is provided at its edge with scale G heretofore referred to, indicating commercial sizes of rods used in reinforce work. Another of said straight portions is provided at its edge with a scale I thereon, indicating different commercial sizes of "continuous" materials, such as expanded metal made in sheet form. The lower edge of the under face of the slide 4 is provided with scales H′ and H which coöperate respectively with the scales G′ and G hereinbefore referred to, both scales indicating the distance from center to center that any or all of the rods listed therein must be placed to equal the area of steel shown to be required on scale of areas D, hereinbefore referred to. The lower face of the slide 4 is also provided with a scale of ratios J coöperating with the scale I, hereinbefore referred to, to determine the size of expanded metal necessary to be used to give the desired percentage as shown on scale of ratios A or B hereinbefore referred to. It will be obvious that by forming one edge of the celluloid or other sheet in a stepped form as shown in Fig. 2 that several different scales may be readily marked thereon; and also that the offset portion so formed serves to conceal the figures of the scale H, which are not in use, thereby lessening the liability of the user to make an incorrect reading. The combination of scales on this face of the rule is so arranged relatively to that on the upper face thereof (shown in Fig. 1), that the area on the scale of areas D directly over the member 32 of the scale of ratios B will be found equal to any selected size or type shown on scales G, G′ and I, if such selection be spaced apart the distance from center to center indicated by the portion of the scales H H′ and J immediately opposite such selected size. Should a ratio or percentage other than 32 be used, the slide 4 should be moved to bring the area over the selected ratio or percentage opposite the number 32 in the scale of ratios B, when the reading as to the distance apart which the reinforce rods must be placed to give the desired area may be made as before. By offsetting the openings it is possible to use a greater number of scales than is possible with slide rules of the usual combination. Also by this means, error in reading results is largely avoided in that scales not involved in the immediate transaction are removed from sight.

In the form of my invention disclosed in Fig. 3 of the drawing the side is provided with the same scales as heretofore described with reference to Figs. 1 and 2, which are however arranged slightly different in order that all of the necessary readings made be made from one side of the rule. In this form of my invention the rule comprises a base 6, which is preferably formed of laminated material, and which is provided with a channel extending longitudinally thereof having squared edges which abut the squared side walls of said channel, the slide being retained in position by a plate 8 of celluloid or other suitable material which is secured to the top of the base in any suitable manner and by metallic strips 9, extending across the ends thereof. The plate 8 has formed therein an opening extending substantially the full length of the rule and two openings O, O′, $O^2$, extending for a portion of the length of the rule, which are offset with reference to each other. The slide 7 and plate 8 are provided with scales A, B, C, $C^2$, E, F, G, G′, H, H′, which are identical in relative arrangements and functions with the scales similarly designated and described in connection with Figs. 1 and 2 and need not be therefore again described in detail.

In the form of my invention disclosed in Fig. 6, the rule comprises a base 10 and a disk 11, which is mounted to rotate on said base, the base being provided with a portion T projecting beyond the periphery of the disk 11, and the disk being provided with cut away portions T', T², permitting the inspection of certain scales on the base therebeneath. The disk and base are provided with scales A, B, C, D, E, F, G, G', H, H', which are identical in relative arrangement and function with the scales similarly designated on Figs. 1 and 2.

In Fig. 8 is shown a construction mounted mechanically to that of Figs. 1 and 2, but the arrangements of the scales are somewhat modified, the arrangement being that scale B of Fig. 1 is omitted and scale D is represented by the figures of percentage. The reverse side of the rule is the same as Fig. 2.

In the designing of, and in the investigation of designs of reinforced concrete, the factors involved are, the "load", "span", "unit stresses", "moduli of elasticity", thickness of concrete and the area of embedded metal. There are various formulæ for determining these factors. Those in general use are known as the "straight line" and the "parabolic" formulæ, both of which are again modified by designers, some of whom use the ultimate and elastic limit values for the unit stresses; thus determining the ultimate strength. While others prefer the use of "safe unit stresses" with the factor of safety in the unit stresses used, there being also other variations sometimes used. In the solution of problems involving the use of any or all of these methods, my rule is equally well adapted.

Referring to the accompanying drawings, Figs. 1, 2 and 3 illustrating my rule and its uses, both the straight line and the parabolic formulæ are employed, Navier's theory and the theory of elacticity being used in the development of both formulæ. In the straight line formulæ used all tension in the concrete is omitted. Tension in the concrete is usually omitted in all formulæ, but to illustrate the scope of the use of this rule, it is not so omitted in the parabolic formulæ illustrated. The safe unit stresses are used in the straight formulæ illustrated. The ultimate unit stress in the concrete and the unit stress at elastic limit in the steel are used in the parabolic formulæ. Moduli corresponding to the unit stresses used are employed in the straight line formulæ, while in the parabolic formulæ the ultimate modulus is assumed to be 2/3 of the initial modulus of the concrete. As will be seen by these citations of extremes, my rule is equally well adapted to the solution of problems based on any formulæ. The formulæ in their most general form are as follows.

$$X = \frac{Rd}{R+ar}$$

$$= \frac{3pRd}{100(1+2a)k}\left[\sqrt{\frac{200(1+2a)K+1}{3pR}}-1\right]$$

$$A = \left(\frac{1+2a}{6ar}\right)b \times k$$

$$p = \frac{50(1+2a)R.K.}{3ar(R+ar)} = \frac{50(1+2a)XK}{3ard}$$

$$r = \frac{R}{2a}\left[\sqrt{\frac{200(1+2a)K+1}{3pr}}-1\right]$$

$$Z = \frac{(1+a)Rd}{2(1+2a)(R+ar)} = \frac{(1+a)x}{2(1+2a)}$$

$$\Sigma c = \frac{1+2a}{6a}box.$$

$$M_s = As(d-z)(1+K_1)$$

$$M_c = \Sigma c(d-z)(1-K_2)$$

$$a = 1-u(1-a')$$

in which $R = \frac{E_s}{E_c} = \frac{\text{Modulus of elasticity of steel}}{\text{Initial modulus of elasticity of concrete}}$ $r = \frac{s}{c} = \frac{\text{Stress per square unit in steel}}{\text{Stress per square unit in concrete}}$ $d$=depth from outer fiber in compression to center of steel in tension.

$x$=distance from outer fiber in compression to neutral axis.

$a$=ratio of modulus of elasticity of concrete at outer fiber to initial modulus.

$a'$=ratio of modulus of elasticity of concrete at ultimate to initial modulus.

$u$=ratio of deformation of concrete at outer fiber to deformation at ultimate.

$b$=breadth of concrete.

$A$=area of steel in tension for breadth, $b$.

$p$=percentage of steel reinforcement for area $bd$ of concrete.

$Z$=distance of center of gravity of total force in compression from the outer fiber in compression.

$\Sigma c$=Summation of all forces in compression.

$K$=factor if tension is considered in the concrete=1 if tension in concrete is not considered.

$K_1$=factor due to moment of tension of concrete, if considered about $z=o$ if tension is not considered.

$K_2$=factor due to moment of tension about center of steel=$o$ if tension is not considered.

$M_s$=moment of tensile forces about center of gravity of compressive forces.

$M_c$=moment of compressive forces, concrete in tension, about center of steel.

For the straight line formulæ, with all tension taken by the steel, these equations become the following:

$$a=1,\ k=1,\ k_1=o,\ k_2=o$$

$$x = \frac{Rd}{R+r} = \frac{6Rd}{100}\left[\sqrt{\frac{200}{pR}+1}-1\right]$$

$$A = \frac{bx}{2r} = \frac{bRd}{2r(R+r)}$$

$$p = \frac{50x}{rd} = \frac{50R}{r(R+r)}$$

$$r = 1/2R\left[\sqrt{\frac{200}{pR}+1}-1\right]$$

$$Z = 1/3x$$

$$\Sigma C = 1/2\,bcx$$

$$M_s = As(d-Z) = M_c = \Sigma c(d-z)$$

$$= \frac{2R(2R+3r)cd^2}{(R+r)^2}$$

For the parabolic formulæ with ultimate value for C and tension in the concrete $u=1$, $a=a'=$ any fraction between the limits 1/2 and 1. Usually taken 1/2 K= 0.98 $K_1=1/150$, $K_2=1/75$. These values substituted in the general equations give the required formulæ, which are similar in form to the straight line. For the parabolic formulæ with ultimate value of C and all tension taken by the steel, and the ultimate value of the modulus of elasticity for concrete used in determining the ratio, the new value of this ratio is $\frac{1}{a'}$ times that given in the general equations i. e. $R=a'R'$, in which $R'$ is the new ratio and $u=1$, $a=a'=1/2$ generally. In these equations the moment M of the internal forces being equal to the moment of the external forces, which involves the load and span, can be expressed in terms of the load and span.

For beams with free ends and uniform loads the well known formula $$M = \frac{wl^2}{8}$$

in which $w=$ the load per square unit and $l=$ the span, is used. The moment for all other cases can be determined by multiplying the moment above described by certain well known constants, or can be independently determined as will be herein subsequently demonstrated.

Combining the above equations by putting the moment of the internal forces=the moment of the external forces there results:

$$d = ml\sqrt{w} \quad \text{I}$$
$$A = nd \quad \text{II}$$

Transforming above equations I and II to logarithmic forms we get the following:

Log. $d=$log. $m+$log. $l+1/2$ log. $w$
Log. $A=$log. $n+$log. $d$

On the scale of loads "F," 1/2 log. $w$ is laid out. On the scale "C" of spans log. $l$ is laid out and the same points used as a scale of thickness of concrete. $m$ is computed and the log. is laid out on scale A. It will be observed that this method of laying out one scale for two separate and distinct purposes having one series of figures for the sub-divisions,—in this case feet with decimal parts of a foot, and inches with their decimal parts; lengths of spans, and thicknesses of concrete, respectively,— as just described for scale "C" above, is novel and a feature possessed by no other sliderule of which I have knowledge, and the advantage of which may be readily appreciated.

On the scale D of the areas of metal the log. of A is laid out. $n$ is computed and the log. laid out in scale B. On scale E the log. of moments is laid out.

It is evident from equation I that the relative positions of $w$ and $l$ being fixed, the relative positions of $m$ and $d$ are also fixed and, if of $m$ and $d$ the latter $d$ is fixed by using the same division points as are used for $l$, then the position of $m$ is absolutely fixed with respect to $w$. It is also evident from equation II that if the relative positions of $d$ and A are fixed, then the position of $n$ is absolutely fixed. Now since $m$ and $n$ may be computed for any formula in common use, it is therefore evident that my rule is not limited to any one formula. It is further evident that if the relative positions of the scales F, C and D are maintained, that innumerable values of $m$ and $n$ may be located in scales A and B, these values of $m$ and $n$ being determined by any selected values for the terms involved in the primary equations; it is thus seen that any equations in use in solving problems in connection with reinforced concrete, may be solved by the proper location of the points $m$ and $n$ in the scales A and B, and my rule is therefore applicable to any formula.

In the rule shown in Figs. 1 and 2, the following values are used in determining $m$ and $n$:

C=500 and variable.
R=12 and variable.
$r=32$ and variable.
$b=12$ inches.
$l=$span in feet.
$w=$load in pounds per square foot.
M=moment in foot pounds per foot wide.
A=area of metal in square inches per foot wide of beam.

Since $m$ and $n$ are functions of $r$, the ratio of the unit stresses, and $r$ a function of $p$, the percentage of reinforcement, the points computed for $m$ and $n$ may be designated by either the ratios $r$ or the percentages $p$, for which they are computed, or the ratios may be subdivided into the unit stresses that produce them, and these unit stresses used to designate these subdivisions, in the lines marked "A" ratios and "B" ratios respectively. If now the load per square foot be brought over the span in feet, the depth of concrete may be read under any ratio of unit stresses or percentage of reinforcement desired and shown on the "A" ratio, and the area of metal read over the same ratio or percentage shown on the "B" ratio. If the loading is not uniform, then the bending moment may be computed. In this case the general formula $M=q\,w\,l^2$ represents this formula, $w$ being the equivalent uniform load. Putting this into logarithm form we have:

Log. M=log. $q+$log. $w+2$ log $l$ or

1/2 log. M$-$1/2 log. $q=$1/2 log. $w+$log. $l$, $q$ being a constant this reduces to 1/2 log. M$-$K=1/2 log. $w+$log. $l$.

On scale "F" 1/2 log. $w$ has been laid out and log. $l$ on scale "C," hence by laying out 1/2 log. M—K, on some other scale, say "E," then the relative positions of these scales having been fixed a reading point "P" is absolutely fixed. Hence, should the load be not uniform the bending moment of the external forces is computed and the point designated as P on scale D in Fig. 1 is brought over the bending moment on scale E Fig. 1. The thickness of concrete and the area of metal for any selected ratio may then be read as in the case of a uniform load as already described. In the use of this scale of bending moments, it is to be noted that the uniform load on a free span equivalent to the load or loads producing any bending moment may be read over any specified span, and this irrespective of the material or materials composing the structure.

A secondary scale $C_2$ of unit stresses for concrete is laid out for the purpose of determining any function for a unit stress other than that for which a rule may be particularly constructed. Its use for this purpose is more fully shown hereinafter.

The rule shown in Figs. 1, 2 and 3 has been computed for beams "simply supported" at the ends, but the same method of laying out can be designed for "continuous" beams. This is not deemed necessary, as if, it is desired to consider continuity the rule as shown may also be used without change of form for the reason that a continuous beam carrying the same load per square foot as a beam simply supported will have the same maximum stresses, as the latter if the span of the latter is considered as 9/10 of the continuous, for example; by reducing any given span of a continuous beam by 1/10, the rule as shown may be used for the new span thus found. Again the rule may be used as shown by those whose practice it is to arbitrarily take the clear span as the span to be computed, on the assumption that this method fully compensates for the difference between "simply supported" and "continuous" beams. Or the bending moment for any manner of loading and for any end conditions may be computed, and the rule used as shown. Or if the load per square foot on the continuous beam be reduced 20%, and the new load so determined used as before.

It is noted that the rule as shown in Figs. 1 and 2 and the formulæ used are for determining the thickness of concrete from outer fiber to center of embedded metal. This in ordinary practice is the depth first obtained, a sufficient amount of concrete being added to properly embed and protect the size of metal selected for use. If, however, it is deemed desirable to determine the total depth of concrete, it is ordinarily assumed that one depth is a function of the other. For example the distance from outer fiber to center of metal is arbitrarily taken as 9/10 the total depth and in this way the rule may be designed, by a slight modification to give the total depth instead of the depth as shown. It is to be understood that in pointing out in this way the certain possible calculations which can be made with this rule, no attempt is made to give all the possible calculations, this rule being, like most slide-rules, capable of determining any one or more of several factors when the remaining factors are known.

The following examples will illustrate some of the uses of my rule. Figs. 1, 2 and 3 in accompanying drawings show the rule as used in the solutions.

Example I: It is desired to design a slab of reinforced concrete, that will support a load of 225 pounds per square foot, which load also includes the weight of slab, over a span of 7'—6" with unit stresses of 500 pounds per square inch in concrete and 16000 pounds per square inch in the embedded metal, thus giving a ratio of $$\frac{16000}{500} = 32.$$

Set 225 on scale of loads over 7.5 on scale of spans, then under 32 on scale of "A" ratios, read 5" on scale of depths which is the thickness of concrete required from top of outer fiber to center of embedded metal. Then above 32 on scale of "B" ratios read .259, nearly, on scale of areas which is the area of steel necessary to reinforce concrete for each foot in width of slab. Now on the reverse side of rule will be found a variety of types and sizes of metal from which may be selected any one desired, with the corresponding distances from center to center at which the one selected must be placed to give the required area. For example:

7/16" round bars should be placed 7" on centers.
3/8" " " " " 5 1/8" on centers.
3/8" square " " " " 6 5/8 on centers.
5/16" " " " " " 4 1/2 on centers.

6" No. 4 "expanded metal" being nearest the ratio, 32 would be selected as the size to be employed if that type is used. If the small size Kahn bar is used, it should be spaced 16 on centers as shown.

Example II: Assuming that the load is not uniform, but that the computed bending moment is 1570 foot pounds, and it is required to design a reinforced concrete slab with the same unit stresses as in Example I. Place point marked P on scale of areas over 1570, the computed bending moment, and proceed as in Example I.

Example III: It is required to determine how much a slab having a depth of 4 3/4" from top of outer fiber to center of embedded metals having an area of .325, per ft. in width of concrete, will support over various spans. The slide is moved until the "A" ratio over 4 3/4", given depth is the same as the "B" ratio under the given area of metal .325. Both ratios are found to be 27. The load which may be supported will now be found over any required span. This load includes the weight of slab. For instance over a span of 7' 6" (7.5) will be found 225 lbs. per square foot as the load; over a span of 8 ft. will be found 200 lbs., nearly and so on.

Example III may also be solved as follows:

$$\frac{.325 \times 100}{12 \times 4\,3/4}$$

to determine the percentage of metal which is found to be .57 nearly, which is the percentage found under 27 (nearly) on the scale of B ratios. If it is desired to know the unit stresses the ratios 27 in the foregoing example corresponding to .57% reinforcement gives unit stresses of 500 lbs. per square inch on the concrete and $27 \times 500 = 13500$ lbs. per square inch on the steel. If 16000 lbs. per square inch were desired with the same ratio 27, or percentage of reinforcement .57, the load determined above (Example III) would then be multiplied by $$\frac{16000}{13500}$$

and the stress on the concrete would be $$\frac{16000}{13500} \times 500 = 592 + \text{pounds per square inch.}$$

Again, should the stress on the concrete be limited to an amount other than 500 that for which the rule illustrated is constructed, the other functions remaining the same as in foregoing Example III, proceed as in Example III, then note the reading on the scale "E" of moments under the point "P" on the scale "D" and bring 400 on scale "$C_2$" to this reading on scale "E." The required load will then be formed over any span as:—180 lbs. per square foot for a span of 7' 6".

The selection of classes of reinforcement and their respective spacings when the B ratio differs from 32—for which the rule illustrated was constructed—is determined by placing the area as found by the ratio used over 32 B ratio and the types and distances from centers will then be found as previously described in Example I.

In case the area is given by size, type and spacing of reinforcement, determine the actual area as follows:—Given 1/2" square bars spaced 3" centers. Bring 3 on the scale H of distances over 1/2" bars on scale of types G, then read the area per foot in width of concrete on scale of areas D over the B ratio 32 on scale B or the mark for which the particular scale is constructed and proceed as before with the area so determined.

While I have shown and described certain forms and arrangement of rules and scales, it is to be understood that variations and modifications can be made without departing from the value and principle of the invention.

What I claim as new and desire to secure by Letters Patent is as follows:

1. A logarithmic scale for designing and investigating the design of reinforced concrete beams or the like consisting of two relatively movable scale members, one of which is provided with two independent similarly laid off logarithmic scales of ratios of unit stresses and a logarithmic scale of loads per square feet in pounds and the other of which scale members is provided with a logarithmic scale common to one of the ratio scales and the load scale of the first scale member and indicating when read on the ratio scale the depth in inches of concrete required for a beam of a certain ratio to support a given load and when read on the load scale the length in feet of the beam required to support such load, and with a scale of area of steel in square inches per foot wide of concrete arranged to coöperate with the other ratio scale on the first mentioned scale member, all of said scales being arranged to permit readings from a single adjustment of the scale members.

2. A logarithmic scale for designing and investigating the design of reinforced concrete consisting of two relatively movable scale members, one of which is provided with two independent similarly laid off logarithmic scales of ratios of unit stresses, with a logarithmic scale of loads per square foot in pounds, and with a logarithmic scale of bending moments in foot pounds per foot wide of concrete, the other of said scale members being provided with a combined logarithmic scale of span in feet and thickness in concrete in inches common to one of the ratio scales and the load scale on the first mentioned scale member, and with a scale of area of steel in square inches per foot wide of concrete common to the other ratio scale and scale of bending moments of said first mentioned scale members, all of said scales being arranged to permit readings from a single position on the scale.

3. A logarithmic scale for designing and investigating the design of reinforced concrete consisting of two relatively movable scale members, one of which is provided with two independent similarly laid off logarithmic scales of ratios of unit stresses, with a logarithmic scale of loads per square foot in pounds, and with a logarithmic scale of bending moments in foot pounds per foot wide of concrete, the other of said scale members being provided with a combined logarithmic scale of span in feet and thickness in concrete in inches common to one of the ratio scales and the load scale on the first mentioned scale member, and with a scale of area of steel in square inches per foot wide of concrete common to the other ratio scale and scale of bending moments of said first mentioned scale members, all of said scales being arranged to permit readings from a single position on the scale, one of said scale members being further provided with a scale of sizes of reinforcing materials and the other of said scales with a distance scale coöperating with said scale of sizes, said distance scale indicating after the scale members have been adjusted to determine the reinforcement required in any beam, the distance apart any of the material in the material scale must be spaced to obtain such amount of reinforcement.

4. A logarithmic scale comprising two relatively movable scale members, said scale members being provided with a plurality of coöperating logarithmic scales enabling the determination by the adjustment of one of the scale members of the amount of reinforcement required in a beam of known size to support a known load, and said scale members being also provided one with a scale of different sizes of reinforcing materials and the other with a coöperating distance scale, such scales being so arranged that when the scale members of the rule have been adjusted to ascertain the amount of reinforcement required, the distance scale may be read on the material scale to indicate the disposition of any of the materials therein to obtain such certain reinforcement.

5. A slide rule comprising separated face plates having openings therein, said face plates being provided with scales adjacent said openings, and a slide positioned between the face plates and provided with scales which are visible through the openings in the face plates and which are adapted to coöperate with the scales adjacent thereto.

6. A slide rule comprising a face plate having an opening therein one edge of which comprises a plurality of offset portions, said face plate being provided with scales adjacent the edges of the opening, and a slide underlying the face plate provided with scales which are visible through the opening in the face plate and which are adapted to coöperate with the scales adjacent the edges of said opening.

7. A slide rule comprising parallel side bars with proximate edges squared, a plate connecting said side bars and overlying the faces thereof, said plate having an opening therein, and a slide having squared edges positioned between said side bars.

8. A slide rule comprising parallel side bars having their proximate edges squared, face plates connecting said side bars and overlying the upper and lower faces thereof, and a slide having squared edges positioned between said side bars.

9. A slide rule comprising parallel bars having their proximate edges squared, face plates overlying the upper and lower surfaces of said side bars and provided with scales, cross bars connecting the ends of the parallel bars and clamping the face plates thereto, and a slide having squared edges positioned between said side bars, said slide being provided with a scale adapted to coöperate with the scale of the face plates.

In testimony whereof I affix my signature in presence of two witnesses.

JOSEPH McC. MICHAELSON.

Witnesses:
   RICHARD EZDORF,
   EGBERT P. LINCOLN.